United States Patent [19]

Asano et al.

[11] Patent Number: 4,546,044
[45] Date of Patent: Oct. 8, 1985

[54] MAGNETIC RECORDING MEDIUM

[75] Inventors: Masao Asano, Tokyo; Tetsuro Sunaga, Hachioji; Hideki Murata, Akishima; Kazumasa Matsumoto, Tokyo, all of Japan

[73] Assignee: Konishiroku Photo Industry Co., Ltd., Tokyo, Japan

[21] Appl. No.: 485,628

[22] Filed: Apr. 18, 1983

[30] Foreign Application Priority Data

Apr. 22, 1982 [JP] Japan .................................. 57-68189
Apr. 30, 1982 [JP] Japan .................................. 57-74028
May 14, 1982 [JP] Japan .................................. 57-82063

[51] Int. Cl.$^4$ ........................ B32B 27/38; G11B 5/70
[52] U.S. Cl. ................................ 428/413; 252/62.54; 428/423.1; 428/425.9; 428/532; 428/694; 428/900
[58] Field of Search ............... 428/425.9, 423.1, 423.7, 428/692, 694, 900, 413, 532; 252/62.54

[56] References Cited

U.S. PATENT DOCUMENTS

| | | | |
|---|---|---|---|
| 3,558,353 | 1/1971 | Harada et al. ................... | 428/425.9 |
| 4,020,227 | 4/1976 | Deffeyes .......................... | 428/329 |
| 4,058,646 | 11/1977 | Vaeth et al. ...................... | 428/900 |
| 4,152,485 | 5/1979 | Mizumura et al. ................ | 428/900 |
| 4,286,022 | 8/1981 | Vermillion et al. .............. | 252/62.54 |
| 4,336,308 | 6/1982 | Yamada et al. .................... | 428/900 |
| 4,357,391 | 11/1982 | Hosaka et al. .................... | 252/62.54 |
| 4,368,239 | 1/1983 | Nakajima et al. ................. | 428/421 |
| 4,370,383 | 1/1983 | Kawahara ......................... | 428/425.9 |
| 4,405,684 | 9/1983 | Blumentritt et al. ............ | 428/425.9 |
| 4,409,291 | 10/1983 | Ogawa et al. ..................... | 428/423.7 |
| 4,410,440 | 10/1983 | Ko .................................... | 428/425.9 |

FOREIGN PATENT DOCUMENTS 52-35526  9/1977  Japan ............................. 252/62.54

Primary Examiner—Ellis P. Robinson
Assistant Examiner—William M. Atkinson
Attorney, Agent, or Firm—Jordan B. Bierman

[57] ABSTRACT

A magnetic recording medium having a magnetic layer containing a urethane resin having a tensile strength of less than 200 kg/cm$^2$ and an elongation at break of 900% or more, and another urethane resin having a tensile strength of 200 kg/cm$^2$ or more and an elongation at break of less than 900%. This recording medium has good surface properties, good magnetic particles' orientation, great durability, and high wear resistance and produces high output.

7 Claims, No Drawings

MAGNETIC RECORDING MEDIUM

FIELD OF THE INVENTION

The present invention relates to a magnetic recording medium, more particularly, to a magnetic recording medium having good surface properties, high magnetic orientation, high durability and wear resistance and producing high output.

BACKGROUND OF THE INVENTION

Most magnetic recording media are produced by coating a non-magnetic base such as a polyester film with a magnetic paint containing magnetic particles and a binder component that provides good adhesion between the magnetic particles and the base, and drying the web thereafter. Magnetic recording media are required to have good electrical characteristics as well as high durability and wear resistance. For this purpose, the binder component used must meet the following requirements: (1) it is capable of dispersing the magnetic particles uniformly, (2) it provides the magnetic recording medium with high electrical characteristics such as high sensitivity and high S/N ratio, and (3) it forms a highly wear-resistant and heat-resistant magnetic layer, thereby increasing the durability of the magnetic recording medium. Therefore, selecting a good binder component is very important for producing a magnetic recording medium with the desired characteristics. Conventionally, the binder is made of a material selected from among many thermoplastic and thermosetting resins, and in many cases, mixtures of polyurethane resins with vinyl chloride-vinyl acetate resins, cellulose derivatives, epoxy resins, or polyamide resins are used. But these resins are not completely miscible with each other, and they cannot form a completely uniform dispersion of magnetic particles, and they are not capable of producing a magnetic recording medium having the desired wear resistance and surface properties.

SUMMARY OF THE INVENTION

The present invention eliminates these defects of the conventional magnetic recording medium.

One object of the present invention is to provide a magnetic recording medium having a new binder composition.

Another object of the present invention is to provide a magnetic recording medium having good magnetic characteristics.

Still another object of the present invention is to provide a magnetic recording medium having high wear resistance.

A further object of the present invention is to provide a magnetic recording medium having good surface properties.

A yet further object of the present invention is to provide a magnetic recording medium having good video characteristics.

Another object of the present invention is to provide a magnetic recording medium which is less likely to shed the magnetic layer as small particles.

These objects of the present invention can be achieved by a magnetic recording medium having a magnetic layer that contains a mixture of a urethane resin having a tensile strength of less than 200 kg/cm$^2$ and an elongation at break of 900% or more (this urethane resin is hereunder referred to as a soft urethane resin) and another urethane resin having a tensile strength of 200 kg/cm$^2$ or more and an elongation at break of less than 900% (this resin is hereunder referred to as a hard urethane resin).

DETAILED DESCRIPTION OF THE INVENTION

As mentioned above, the soft urethane resin used in the present invention has a tensile strength of less than 200 kg/cm$^2$ and an elongation at break of 900% or more, and the hard urethane resin has a tensile strength of 200 kg/cm$^2$ or more and an elongation at break of less than 900%. In accordance with the preferable embodiment of the present invention, the soft urethane resin has a tensile strength of less than 175 Kg/cm$^2$ and an elongation at break of not less than 1000% and the hard urethane resin has a tensile strength of not less than 225 Kg/cm$^2$ and an elongation at break of less than 800%. The methods for measuring the two parameters are specifically described in JIS K-6301. Briefly stated, a urethane resin film 100μ thick is heated first at 80° C. for 10 minutes, then at 120° C. for 10 minutes; the film is then left to stand for 3 days at 25° C. and 55% R.H.; thereafter, in accordance with JIS K-6301 and under the same environmental conditions, the film is drawn at a rate of 200 mm/min with a dumbbell No. 2.

The soft and hard urethane resins are selected from among the polyester polyurethane resins and polyether polyurethane resins prepared by reacting polyols with diisocyanate compounds to introduce a urethane group into the polyols. Illustrative polyols include polyester polyols produced by reacting organic dibasic acids (e.g. phthalic acid, adipic acid, dimerized linolenic acid and maleic acid) with glycols (e.g. ethylene glycol, propylene glycol, butylene glycol and diethylene glycol) or polyhydric alcohols (e.g. trimethylolpropane, hexanetriol, glycerin, trimethylolethane and pentaerythritol) or two or more polyols selected from among these glycols and polyhydric alcohols; lactone polyester polyols synthesized from lactams such as ε-caprolactam, α-methyl-1- caprolactam, ε-methyl-ε-caprolactam and γ-butyrolactam; and polyether polyols synthesized from ethylene oxide, propylene oxide and butylene oxide. Illustrative diisocyanate compounds are tolylene diisocyanate, 4,4'-diphenylmethane methane diisocyanate, hexamethylene diisocyanate and metaxylylene diisocyanate. The urethane resins suitable for use in the present invention are generally produced by reaction between polyisocyanates and polyols, and they may be used in the form of urethane resins or urethane prepolymers containing a free isocyanate and/or hydroxyl group, or in the form of urethane elastomers free from these reactive terminal groups. The process for preparing urethane resins, urethane prepolymers and urethane elastomers and the method of curing and crosslinking the same are well known in the art and details thereof are not given in this specification.

The soft urethane resin may be mixed with the hard urethane resin at any ratio, and a mixing ratio of 5:95 to 95:5 on a weight basis is preferred. An 80:20 to 20:80 range is particularly preferred.

The magnetic layer of the magnetic recording medium according to the present invention may also contain an isocyanate or polyisocyanate as a curing agent to further improve the durability of the recording medium. Illustrative isocyanates are tolylene diisocyanate, 4,4'-diphenylmethane diisocyanate, hexamethylene diisocyanate and isophorone diisocyanate. Illustrative polyisocyanates are addition products of diisocyanates and trivalent polyols, pentamers of diisocyanates, and decarboxylated products of water and 3 mols of diisocyanates. Polyisocyanates that can be easily produced on a commercial basis include an addition product of 3 mols of tolylene diisocyanate and 1 mol of trimethylolpropane, an addition product of 3 mols of metaxylylene diisocyanate and 1 mol of trimethylolpropane, a pentamer of tolylene diisocyanate, a pentamer of 3 mols of tolylene diisocyanate and 2 mols of hexamethylene diisocyanate, andadecarboxylated product of 3 mols of hexamethylene diisocyanate and 1 mol of water.

Magnetic particles suitable for use in the present invention include $\gamma$-$Fe_2O_3$, $Fe_3O_4$, Co-doped $\gamma$-$Fe_2O_3$, Co-doped $Fe_3O_4$ and $CrO_2$ powders, as well as metal powders such as Fe and Co powders, and metallic alloy powders. These ferro-magnetic powders are dispersed in the soft and hard urethane resins, optionally together with an isocyanate or polyisocyanate, to make a magnetic paint from which the magnetic recording medium of the present invention is produced.

This magnetic paint preferably contains a cellulosic resin to produce a magentic recording medium with improved wear resistance and video characteristics, as well as to minimize the chance of shedding the magnetic layer as small particles. Suitable cellulosic resins are nitrocellulose, ethyl cellulose, acetyl cellulose, cellulose acetate butyrate and cellulose propionate. Nitrocellulose (NC) is particularly preferred. The cellulosic resin may be mixed with the blend of soft and hard urethane resins at any ratio, and a mixing ratio of 1:99 to 50:50 on a weight basis is preferred.

The magnetic paint may further contain an epoxy resin or its derivative to produce a magnetic recording medium having further improved wear resistance, surface properties, video characteristics and reduced chance of shedding the magnetic layer as small particles. An epoxy resin having at least 2 epoxy groups in the molecule is used, and examples are a glycidyl ether type, glycidyl ester type, glycidyl amine type, linear aliphatic epoxide type and an aliphatic epoxide type. A bisphenol A type diglycidyl ether resin is preferred, and this is commercially available from Shell Chemical Co. under the tradenames Epikote #1004, Epikote #1007 and Epikote #1009. Epoxy resins having a melting point of 50° or higher are particularly preferred. Illustrative epoxy resin derivatives include polyhydroxyl ether type polymers and phenoxy resins or modified phenoxy resins containing polyhydroxypolyether esters or the like. Commercial products are PKHH, PKHC and PKHA of Union Carbide Corporation and Epichron 1030, 4030, H-330, H-340, H-350 and H-343 of Dainippon Ink and Chemicals, Inc. The epoxy resin or its derivative may be mixed with the blend of soft and hard urethane resins at any ratio, and a mixing ratio of 1:99 to 60:40 on a weight basis is preferred. The epoxy resin and its derivative may be mixed at any ratio so long as the two are miscible with each other.

The magnetic paint according to the present invention is prepared by dissolving or dispersing ferromagnetic particles, the soft and hard urethane resins, and the optional cellulosic resin or epoxy resin or its derivative in an organic solvent. If necessary, the magnetic paint may contain additives such as a dispersant, a lubricant, and abrasive and an antistat (antistatic agent). The magnetic paint is applied to a non-magnetic base to form a magnetic layer for the magnetic recording medium of the present invention. For details of the method of preparing the magnetic paint, see Japanese Patent Publication Nos. 15/60, 26794/64, 186/68, 28043/72, 28045/72, 28046/72, 28048/72, 31445/72, 11162/73, 21331/73, 33683/73, and Russian Patent No. 308033.

The blend of soft and hard urethane resins which optionally contains a cellulosic resin or an epoxy resin or its derivative is used as a binder either alone or in combination with known binders if they are not detrimental to the objects of the present invention. Suitable known binders are 1) resins that are curable upon irradiation with electron beams and 2) polyfunctional monomers. Examples of the first type are unsaturated prepolymers such as those of maleic anhydride type, urethaneacrylic type, epoxyacrylic type, polyester acrylic type, polyether acrylic type, polyurethane acrylic type and polyamide acrylic type. Examples of the second type are those of ether acrylic type, urethane acrylic type, epoxy acrylic type, phosphate ester acrylic type, aryl type and hydrocarbon type.

Examples of the dispersant are aliphatic acids having 6 to 18 carbon atoms (RCOOH wherein R is a saturated or unsaturated alkyl group having 5 to 17 carbon atoms) such as caprylic acid, capric acid, lauric acid, myristic acid, palmitic acid, stearic acid, oleic acid, elaidic acid, linoleic acid and linolenic acid. Metal soaps made of alkali metals (Li, Na, K, etc.) or alkaline earth metals (Mg, Ca, Ba, etc.) of these aliphatic acids, as well as lecithin are also used as the dispersant. Higher alcohols having 12 or more carbon atoms, as well as sulfate esters of these alcohols are also usable. These dispersants are used in an amount of 1 to 20 parts by weight for 100 parts by weight of the binder. Illustrative dispersants are listed in Japanese Patent Publications Nos. 28369/64, 17945/69, 15001/73, U.S. Pat. Nos. 3,587,993 and 3,470,021.

Examples of the lubricant are silicone oil, carbon black, graphite, carbon black graft polymer, molybdenum disulfide, tungsten disulfide, and aliphatic acid esters of monobasic aliphatic acids having 12 to 16 carbon atoms and monovalent alcohols having carbon atoms whose number as added to the number of carbon atoms in the aliphatic acids is 21 to 23 (such esters are conventionally referred to as wax). These lubricants are used in an amount of 0.2 to 20 parts by weight for 100 parts by weight of the binder. For more details of these lubricants, see Japanese Patent Publications Nos. 23889/68 and 81543/68, as well as U.S. Pat. Nos. 3,470,021; 3,492,235; 3,497,411; 3,523,086; 3,625,760; 3,630,772; 3,634,253; 3,642,539; and 3,687,725; and IBM Technical Disclosure Bulletin, vol. 9, No. 7, page 779, December 1966, and ELEKTRONIK, No. 12, page 380, 1961.

Suitable abrasives are selected from among known abrasive materials such as fused alumina, silicon carbide, chromium oxide, corundum, artificial corundum, diamond, artificial diamond, garnet and emery (main components: corundum and magnetite). These abrasives generally have an average grain size of 0.05 to 5$\mu$, preferably from 0.1 to 2$\mu$. They are used in an amount of 7 to 20 parts by weight for 100 parts by weight of the binder. Illustrative abrasives are described in Japanese Patent Application (OPI) No. 115510/74 (the symbol OPI as used herein means an examined published Japanese patent application), U.S. Pat. Nos. 3,007,807; 3,041,196; 3,687,725; British Patent No. 1,145,349, and German Patent (DT-PS) No. 853, 211.

Suitable antistats are fine particles of an electrically conductive material such as graphite, carbon black, or carbon black graft polymer; a natural surfactant such as saponin; an alkylene oxide, glycerin or glycidol nonionic surfactant; a cationic surfactant such as higher alkylamines, quaternary ammonium salts, heterocyclic compounds (e.g. pyridine), and phosphonium or sulfonium; an anionic surfactant containing an acidic group such as carboxylic acid group, sulfonic acid group, phosphoric acid group, sulfate ester group or phosphate ester group; and an amphoteric surfactant such as amino acids, aminosulfonic acids, and sulfate or phosphate esters of aminoalcohol.

Surfactants that can be used as antistats are described in U.S. Pat. Nos. 2,271,623; 2,240,472; 2,288,226; 2,676,122; 2,676,924; 2,676,975; 2,691,566; 2,727,860; 2,730,498; 2,742,379; 2,739,891; 3,068,101; 3,158,484; 3,201,253; 3,210,191; 3,924,540; 3,415,649; 3,441,413; 3,442,654; 3,475,174; 3,545,974; German Patent Application (OLS) No. 1,942,665; British Patents Nos. 1,077,317; 1,198,450; Oda Ryohei et al., "Synthesis and Applications of Surfactants", Maki Shoten, 1964; A.W. Bailey, "Surface Active Agents", Interscience Publication Incorporated, 1958; T.P. Shisley, "Encyclopaedia of Surface Active Agents", vol. 2, Chemical Publishing Company, 1964; and "Handbook of Surfactants", 6th printing, Sangyo Tosho K.K. December 20, 1966. These surfactants may be used either alone or in combination. They are generally used as antistats, but in some cases, they may be used for other purposes, such as for providing a uniform dispersion of magnetic particles, improved magnetic characteristics or as a lubricant or a coating aid.

Examples of the organic solvent to make the magnetic paint include ketones such as acetone, methyl ethyl ketone (MEK), methyl isobutyl ketone (MIBK), and cyclohexanone; alcohols such as methanol, ethanol, propanol and butanol; esters such as methyl acetate, ethyl acetate, butyl acetate, ethyl lactate and glycol acetate monoethyl ether; glycol ethers such as diethyl ether, glycol dimethyl ether, glycol monoethyl ether and dioxane; tars, aromatic hydrocarbons such as benzene, toluene and xylene; and hydrocarbon halides such as methylene chloride, ethylene chloride, carbon tetrachloride, chloroform, ethylene chlorohydrin and dichlorobenzene.

Suitable materials for the non-magnetic base include polyesters such as polyethylene terephthalate and polyethylene-2,6-naphthalate; polyolefins such as polypropylene; cellulose derivatives such as cellulose triacetate and cellulose diacetate; plastics such as polycarbonates; nonmagnetic metals such as copper, aluminum and zinc; and ceramics such as glass, porcelain and earthen ware. The base may assume various forms such as tape, sheet, card, disk and drum, and suitable materials are used depending upon the specific form. When the non-magnetic base is in a film or sheet form, its thickness varies from about 3 to 100 um, preferably from 5 to 50 um. When the base is in a disk or card form, the thickness is between about 0.5 and 10 um. When the base is drum-shaped, it is in a cylindrical form whose specific configuration is determined by the recorder with which it is used.

The back surface (the surface opposite to the side provided with the magnetic layer) of the base may be provided with a back coating for such purposes as antistatic buildup and prevention of transfer. For details of the back coating, see U.S. Pat. Nos. 2,804,401; 3,293,066; 3,617,378; 3,062,676; 3,734,772; 3,476,596; 2,643,048; 2,803,556; 2,887,462; 2,923,642; 2,997,451; 3,007,892; 3,041,196; 3,115,420 and 3,166,688.

The magnetic particles, the blend of hard and soft urethane resins (optionally containing cellulosic resins or epoxy resins or derivatives thereof), dispersant, lubricant, abrasive, antistat and solvent described above are mixed to form a magnetic paint. The paint is prepared by charging a mixer with the magnetic particles and all other components simultaneously or sequentially. For instance, the magnetic particles are added to a solution containing the dispersant, the mixture is then stirred for a predetermined time, and thereafter the other components are added, with continued stirring.

Various mixers may be used to achieve thorough mixing of the components. Examples are a two-roll mill, three-roll mill, ball mill, pebble mill, sand grinder, Szegvari attritor, high-speed impeller disperser, high-speed stone mill, high-speed impact mill, disperkneader, high-speed mixer, homogenizer and an ultrasonic disperser. For details of the kneading and dispersing techniques, see T. C. Patton, "Paint Flow and Pigment Dispersion", John Wiley & Sons, 1964, as well as U.S. Pat. Nos. 2,581,414 and 2,855,156.

A magnetic recording layer is formed from the magnetic paint on the base by air doctor coating, blade coating, air knife coating, squeeze coating, impregnate coating, reverse roll coating, transfer roll coating, gravure coating, kiss coating, cast coating, and spray coating. For details of these and other coating techniques, see "Coating Kogaku (Coating Engineering)", published by Asakura Shoten, Mar. 20, 1971, pp. 253–277.

The magnetic recording layer thus formed on the base is dried after the magnetic particles in the layer are optionally oriented. If necessary, the dried layer is surface-smoothened or cut to the desired shape, thus forming the magnetic recording medium of the present invention. The orientation of magnetic particles is effected in an a.c. or d.c. magnetic field having a magnetic induction of about 500 to 2,000 Gauss. The drying temperature is between about 50 and 100° C., and the drying time is between about 3 and 10 minutes. Information on the method of orienting magnetic particles is also contained in U.S. Pat. Nos. 1,949,840; 2,796,359; 3,001,891; 3,172,776; 3,416,949; 3,473,960; 3,681,138; Japanese Patent Publication Nos. 3427/57, 28368/64, 23624/65, 23625/65, 13181/66, 13043/73 and 39722/73. The direction of orientation depends on the specific use of the magnetic recording medium. For audio tape, small-size video tape and memory tape, the direction is parallel to the tape length, whereas for broadcasting video tape, the direction of orientation is 30 to 90 degrees off the tape length.

The present invention is hereunder described in greater detail by reference to examples and comparative examples. It will be readily understood by those skilled in the art that the various modifications can be made to the components, their proportions and the order of the steps for producing magnetic recording media without departing from the scope and spirit of the present invention. The magnetic recording medium of the present invention can be used not only as audio, video and computer tapes but also as magnetic card, magnetic sheet, magnetic disk and magnetic drum. Therefore, it should be understood that the scope of the present invention is by no means limited to the following examples.

EXAMPLE 1

The following ingredients were intimately mixed in a ball mill to prepare a dispersion.

| | |
|---|---|
| Magnetic powder (Co-doped $\gamma$-Fe$_2$O$_3$) | 60 g |
| Pandex T-5610 (soft urethane resin of Dainippon Ink & Chemicals, Inc., tensile strength: 155 kg/cm$^2$, elongation at break: 1,000%) | 4 g (dry basis) |
| Estan 5710 F-1 (hard urethane resin of B. F. Goodrich Chemical Co., tensile strength: 387 kg/cm$^2$, elongation at break: 430%) | 16 g (dry basis) |
| Lecithin | 2 g |
| MEK | 80 ml |
| Toluene | 80 ml |
| THF | 80 ml |

To the dispersion, 5 parts of Collonate (polyisocyanate of Nippon Polyurethane Industry Co., Ltd., 75 wt. % ethyl acetate solution of an adduct of 1 mol of trimethylolpropane and 3 mols of tolylene diisocyanate) was added, and the mixture was thoroughly stirred to make a magnetic paint composition.

The magnetic paint was applied to one surface of a polyethylene terephthalate film (15μ thick) in a magnetic field of 2,000 Gauss to form a magnetic layer having a dry thickness of 5μ. The resulting broad web was supercalendered and slit to form a ½ inch-wide magnetic video tape sample A-1 of the present invention.

A comparative video tape sample S-1 was prepared by repeating the same procedure except that Pandex T-5610 was replaced by 4 g of VAGH (vinyl chloride-vinyl acetate-vinyl alcohol copolymer of Union Carbide Corporation).

EXAMPLE 2

A video tape sample A-2 of the present invention was prepared by repeating the procedure of Example 1 except that Pandex T-5610 was replaced by MAU-2010 (product of Dainichi Seika Colour & Chemicals Mfg. Co., Ltd., tensile strength: 30 kg/cm$^2$, elongation at break: 1,175%) and Estan 5701-F-1 by Nipporan N-3022 (product of Nippon Polyurethane Industry Co., Ltd., 35% ethyl acetate on a dry basis, tensile strength: 258 kg/cm$^2$, elongation at break: 800%).

The three samples, A-1, A-2 and S-1 had the following performance characteristics.

TABLE 1

| Sample | S-1 | A-1 | A-2 |
|---|---|---|---|
| Squareness ratio | 0.70 | 0.73 | 0.74 |
| Orientation ratio | 1.71 | 1.76 | 1.77 |
| Chroma S/N ratio (dB)* (AM 1-500 kHz) | 0 | +1.5 | +1.5 |
| Gloss (%)** | 110 | 130 | 130 |
| Still mode durability (min)*** | 3 or less | 15 or more | 15 or more |

*The ratio of the effective value (S) of chroma signal (3.58 MHz) to the noise level of the reproduced output obtained after recording the chroma signal on a luminance carrier signal at 0.714 V$_{p-p}$. Comparative sample S-1 was taken as 0 dB.
**The gloss achieved by reflecting light at 60°, with the reference plate taken as 100%. The higher the relative value, the more glossy the sample was.
***The time required for a still image to disappear. The longer the time, the more durable and wear-resistant the magnetic recording medium was.

Table 1 shows the superiority of the samples of the present invention to the comparative sample.

EXAMPLE 3

Four video tape samples of the present invention (A-3, A-4, A-5 and A-6) and four comparative samples (S-2, S-3, S-4 and S-5) were prepared by repeating the procedure of Example 1 except that the urethane resins indicated in Table 2 were used in the formulations shown in Table 3.

TABLE 2

| Resin No. | Urethane resin | Tensile strength (kg/cm$^2$) | Elongation at break (%) |
|---|---|---|---|
| P-1 | Paraprene Finish 84 (Nippon Polyurethane Industry Co., Ltd.) | 300-400 | 600-800 |
| P-2 | Paraprene 22S (Nippon Polyurethane Industry Co., Ltd.) | 500 | 600 |
| P-3 | Paraprene 25SM (Nippon Polyurethane Industry Co., Ltd.) | 600 | 480 |
| P-4 | Nipporan N-5103 (Nippon Polurethane Industry Co., Ltd.) | 600-650 | 740-770 |
| P-5 | Nipporan N-3113 (Nippon Polyurethane Industry Co., Ltd.) | 525 | 620 |
| P-6 | MAU-2010 (Dainichi Seiki Colour & Chemicals Mfg. Co., Ltd.) | 30 | 1175 |
| P-7 | Pandex T-5610 (Dainippon Ink & Chemicals, Inc.) | 155 | 1000 |
| P-8 | Pandex T-5201 (Dainippon Ink & Chemicals, Inc. | 350 | 900 |
| P-9 | MAU-2070 (Dainichi Seika Colour & Chemicals Mfg. Co., Ltd.) | 135 | 700 |

TABLE 3

| | Sample | | | | | | | |
|---|---|---|---|---|---|---|---|---|
| Ingredient | S-2 | S-3 | S-4 | S-5 | A-3 | A-4 | A-5 | A-6 |
| Co-doped $\gamma$-Fe$_2$O$_2$ (g) | 60 | 60 | 60 | 60 | 60 | 60 | 60 | 60 |
| P-1 (g on dry basis) | 10 | — | — | — | — | — | — | — |
| P-2 (g on dry basis) | 10 | — | — | — | — | 10 | — | — |
| P-3 (g on dry basis) | — | 10 | — | 10 | — | — | — | — |
| P-4 (g on dry basis) | — | 10 | 10 | — | — | — | — | — |
| P-5 (g on dry basis) | — | — | — | — | 10 | — | 15 | 5 |
| p-6 (g on dry basis) | — | — | — | — | 10 | — | 5 | 15 |
| P-7 (g on dry basis) | — | — | — | — | — | 10 | — | — |
| P-8 (g on dry basis) | — | — | 10 | — | — | — | — | — |
| P-9 (g on dry basis) | — | — | — | 10 | — | — | — | — |
| Lecithin (g) | 2 | 2 | 2 | 2 | 2 | 2 | 2 | 2 |
| MEK (ml) | 80 | 80 | 80 | 80 | 80 | 80 | 80 | 80 |
| Toluene (ml) | 80 | 80 | 80 | 80 | 80 | 80 | 80 | 80 |
| TH (ml) | 80 | 80 | 80 | 80 | 80 | 80 | 80 | 80 |

The performance characteristics of the respective samples are listed in Table 4.

TABLE 4

| Sample | S-2 | S-3 | S-4 | S-5 | A-3 | A-4 | A-5 | A-6 |
|---|---|---|---|---|---|---|---|---|
| Squareness ratio | 0.61 | 0.65 | 0.67 | 0.66 | 0.74 | 0.75 | 0.76 | 0.75 |
| Orientation ratio | 1.53 | 1.56 | 1.61 | 1.59 | 1.77 | 1.78 | 1.75 | 1.76 |
| Chroma S/N ratio (dB)* (AM 1-500 kHz) | 0 | −1.0 | +0.5 | +0.5 | +2.5 | +2.5 | +3.0 | +3.0 |
| Gloss (%) | 100 | 100 | 115 | 110 | 130 | 1.35 | 130 | 130 |
| Still mode durability (min) | 5 | 7 | 9 | 7 | 20–30 | 20–30 | 20–30 | 20–30 |

*Comparative sample S-2 was taken as 0 dB.

Table 4 shows the superiority of the samples of the present invention to the comparative samples.

EXAMPLE 4

The following ingredients were intimately mixed in a ball mill to prepare a dispersion.

| | |
|---|---|
| Magnetic powder (Co-doped $\gamma$-$Fe_2O_3$) | 60 g |
| Celnoba BTH ½ (nitro-cellulose resin of Asahi Chemicals Industry Co., Ltd.) | 4 g (dry basis) |
| Pandex T-5610 (soft urethane resin of Dainippon Ink & Chemicals, Inc., tensile strength: 155 kg/cm². elongation at break: 1,000%) | 6 g (dry basis) |
| Crisvon 4216 (hard urethane resin of Dainippon Ink & Chemicals, Inc., 30% MEK on dry basis, tensile strength: 680 kg/cm², elongation at break: 530%) | 10 g (dry basis) |
| Lecithin | 2 g |
| MEK | 80 ml |
| Toluene | 80 ml |
| THF (tetrahydrofuran) | 80 ml |

To 100 g of the dispersion, 1.05 g of Collonate (polyisocyanate of Nippon Polyurethane Industry Co., Ltd., 75 wt. % ethyl acetate solution of an adduct of 1 mol of trimethylolpropane and 3 mols of tolylene diisocyanate) was added, and the mixture was thoroughly stirred to make a magnetic paint composition.

The magnetic paint was applied to one surface of a polyethylene terephthalate film (15μ thick) in a magnetic field of 2,000 Gauss to form a magnetic layer having a dry thickness of 5μ. The resulting broad web was supercalendered and slit to form a 12.65 mm-wide magnetic video tape sample A-7 of the present invention.

A comparative video tape sample S-6 was prepared by repeating the same procedure except that Celnoba BTH ½ was not used and the amounts of Pandex T-5610 and Crivson 4216 were changed to 7 g and 13 g (dry basis), respectively.

EXAMPLE 5

A video tape sample A-8 of the present invention was prepared from a magnetic paint composition having the formulation listed below by repeating the procedure of Example 4.

| | |
|---|---|
| Magnetic powder (Co-doped $\gamma$-$Fe_2O_3$) | 60 g |
| Celnoba BTH ½ | 4 g (dry basis) |
| MAU-2010 (soft urethane resin of Dainichi Seika Colour & Chemicals Mfg. Co., Ltd., tensile strength: 30 kg/cm², elongation at break 1,175%) | 10 g (dry basis) |
| PS-623 (hard urethane resin of Mitsui-Nisso Urethane Co., Ltd., tensile strength: 500–550 kg/cm², elongation at break: ca. 5%) | 6 g (dry basis) |
| Lecithin | 2 g |
| MEK | 80 ml |
| Toluene | 80 ml |
| THF | 80 ml |

A comparative video tape sample S-7 was prepared by repeating the same procedure except that the amount of Celnoba BTH ½ was reduced to 2 g and MAU-2010 and PS-623 were replaced by 9 g (dry basis) of N-5103 (product of Nippon Polyurethane Industry Co., Ltd., tensile strength: 600–650 kg/cm², elongation at break: 740–770%) and 9 g (dry basis) of Paraprene 22S (product of Nippon Polyurethane Industry Co., Ltd., tensile strength: 500 kg/cm², elongation at break: 600%).

The performance characteristics of samples A-7, A-8, S-6 and S-7 are listed in Table 5.

TABLE 5

| Sample | A-7 | A-8 | S-6 | S-7 |
|---|---|---|---|---|
| Squareness ratio | 0.80 | 0.80 | 0.74 | 0.70 |
| Orientation ratio | 1.83 | 1.81 | 1.73 | 1.70 |
| Chroma S/N ratio (dB)* (AM 1-500 kHz) | +1.2 | +1.1 | +0.7 | 0 |
| Still mode durability (min) | 40–50 | 40–50 | 20–30 | ≦5 |

*Comparative sample S-7 was taken as 0 dB.

The data in Table 5 demonstrates the superiority of the samples of the present invention in respect of magnetic particles' orientation, wear resistance (still mode durability), and electromagnetic properties.

EXAMPLE 6

The following ingredients were intimately mixed in a ball mill to prepare a dispersion.

| | |
|---|---|
| Magnetic powder ($\gamma$-$Fe_2O_3$) | 60 g |
| Epikote 1004 (epoxy resin of Shell Chemical Co.) | 4 g (dry basis) |
| Pandex T-5610 (soft urethane resin of Dainippon Ink & Chemicals, Inc., tensile strength: 155 kg/cm², elongation at break: 1,000%) | 4 g (dry basis) |
| Crisvon 4216 (hard urethane resin of Dainippon Ink & Chemicals, Inc., tensile strength: 680 kg/cm², elongation | 12 g (dry basis) |

-continued

| | |
|---|---|
| at break: 530%) | |
| Lecithin | 2 g |
| MEK | 80 ml |
| Toluene | 80 ml |
| THF | 80 ml |

To 100 g of the dispersion, 1.05 g of isophorone diisocyanate (99% pure product of Veba-Chemie AG) was added, and the mixture was stirred thoroughly to make a magnetic paint composition.

The magnetic paint was applied to one surface of a polyethylene terephthalate film (15μ thick) in a magnetic field of 2,000 Gauss to form a magnetic layer having a dry thickness of 5μ. The resulting broad web was supercalendered and slit to form a 3.81 mm-wide magnetic video tape sample A-9 of the present invention A comparative video tape sample S-8 was prepared by repeating the same procedure except that Pandex T-5610 was omitted and the amount of Crisvon 4216 was increased to 16 g (dry basis).

EXAMPLE 7

A video tape sample A-10 of the present invention was prepared by repeating the procedure of Example 6 except that Pandex T-5610 was replaced by MAU-2010, and crisvon 4216 by Nipporan N-3022 (product of Nippon Polyurethane Industry Co., Ltd., 35% ethyl acetate on a dry basis, tensile strength: 258 kg/cm² and elongation at break: 800%).

The performance characteristics of samples A-9, A-10 and S-8 are listed below.

TABLE 6

| Sample | S-8 | A-9 | A-10 |
|---|---|---|---|
| Squareness ratio | 0.78 | 0.82 | 0.83 |
| Orientation ratio | 1.96 | 2.10 | 2.15 |
| Gloss (%) | 135 | 160 | 162 |

The data shows the superiority of the samples of the present invention to the comparative sample.

EXAMPLE 8

Two video tape samples of the present invention (A-11 and A-12) and three comparative samples (S-9, S-10 and S-11) were prepared by repeating the procedure of Example 6 except that γ-Fe₂O₃ was replaced by Co-doped γ-Fe₂O₃ and the binder resins indicated in Table 7 were used in the formulations listed in Table 8. All samples were slit to a tape width of ½ inch.

TABLE 7

| Polymer No. | Polymer | Manufacturer | Tensile strength (kg/clm²) | Elongation at break (%) |
|---|---|---|---|---|
| PV-1 | Nipporan N5103 | Nippon Polyurethane Industry Co., Ltd. | 600–650 | 740–770 |
| PV-2 | Nipporan N-3022 | Nippon Polyurethane Industry Co., Ltd. | 258 | 800 |
| PV-3 | MAU-2010 | Dainichi Seika Colour & Chemicals Mfg. Co., Ltd. | 30 | 1175 |
| PV-4 | MAU-2070 | Dainichi Seika Colour & Chemicals Mfg. Co., Ltd. | 135 | 700 |
| EP-1 | Epikote 1004 | Sheel Chemical Co. | — | — |
| EP-2 | PKHH | Union Carbide Corporation | — | — |

TABLE 8

| Ingredients | S-9 | S-10 | S-11 | A-11 | A-12 |
|---|---|---|---|---|---|
| Co-doped γ-Fe₂O₃ (g) | 60 | 60 | 60 | 60 | 60 |
| PV-1 (g on dry basis) | 16 | 16 | 8 | — | — |
| PV-2 (g on dry basis) | — | — | — | 8 | 9 |
| PV-3 (g on dry basis) | — | — | — | 8 | 7 |
| PV-4 (g on dry basis) | — | — | 8 | — | — |
| EP-1 (g on dry basis) | 4 | — | 4 | 4 | 2 |
| Ep-2 (g on dry basis) | — | 4 | — | — | 2 |
| Lecithin (g) | 2 | 2 | 2 | 2 | 2 |
| MEK (ml) | 80 | 80 | 80 | 80 | 80 |
| Toluene (ml) | 80 | 80 | 80 | 80 | 80 |
| THF (ml) | 80 | 80 | 80 | 80 | 80 |

The performance characteristics of the respective samples are listed in Table 9.

TABLE 9

| Sample | S-9 | S-10 | S-11 | A-11 | A-12 |
|---|---|---|---|---|---|
| Squareness ratio | 0.70 | 0.71 | 0.72 | 0.80 | 0.80 |
| Orientation ratio | 1.71 | 1.73 | 1.70 | 1.82 | 1.81 |
| Chroma S/N ratio (dB)* (AM 1–500 kHz) | 0 | +0.2 | +0.3 | +1.5 | +1.3 |
| Gloss (%) | 98 | 100 | 103 | 177 | 183 |
| Still mode durability | ≦3 | ≦3 | ≦3 | ≧15 | ≧15 |

*Comparative sample No. 9 was taken as 0 dB.

The data of Table 9 shows the superiority of the samples of the present invention with respect to the tape surface properties, electormagnetic properties, and wear resistance (still mode durability).

What is claimed is:

1. A magnetic recording medium having a magnetic layer containing a urethane resin having a tensile strength of less than 175 kg/cm² and an elongation at break of 1000% or more, and another urethane resin having a tensile strength of 225 kg/cm² or more and an elongation at break of less than 800% wherein the mixing ratio of said urethane to said another urethane is from 80:20 to 20:80 on a weight basis.

2. A magnetic recording medium according to claim 1 wherein said magnetic layer further includes a cellulosic resin.

3. A magnetic recording medium according to claim 2 wherein said cellulosic resin is nitrocellulose.

4. A magnetic recording medium according to claim 1 wherein said magnetic layer further includes an epoxy resin or a derivative thereof.

5. A magnetic recording medium according to claim 4 wherein said epoxy resin is a bisphenol A diglycidyl ether type polymer.

6. A magnetic recording medium according to claim 4 wherein said epoxy resin derivative is a polyhydroxy ether type polymer.

7. A magentic recording medium according to claim 6 wherein said polymer is a phenoxy resin.

* * * * *